Patented Aug. 22, 1939

2,170,043

UNITED STATES PATENT OFFICE 2,170,043

COATING PROCESS

Gladstone Walter Worrall, Northwich, England, assignor to Imperial Chemical Industries Limited, a corporation of Great Britain No Drawing. Application April 14, 1937, Serial No. 136,929. In Great Britain April 24, 1936

5 Claims. (Cl. 91—68)

This invention relates to the coating of materials, particularly to coatings which are flexible, water-proof and corrosion resisting.

It has been proposed in the past to use latex rubber as a protective coating for metals, wood, paper, and fabrics, but its use is limited on account of its absorbent properties. Attempts have been made in the past to minimise this effect by vulcanizing or by reducing the non-rubber constituents in the latex by concentration and particularly by repeated creaming. Difficulty has also been found in persuading latex rubber to adhere to nonporous surfaces. No attempt to provide a flexible, water-proof and corrosion resisting coating economically has hitherto been successful.

This invention has as an object to prepare a new flexible, water-proof and corrosion resistant coating. A further object is to devise a flexible, water-proof and corrosion resisting coating which can be applied to fabrics, paper and like substances and wood, which can be cheaply manufactured. A further object is to devise a method of applying such a coating to non-porous surfaces. A further object is to devise a method of manufacturing such a coating. Further objects will appear hereinafter.

These objects are accomplished by the following invention. I have found that I can provide materials with a protective coating by applying to the materials one or more coatings of latex rubber, allowing said coating or coatings to dry, then causing the dried coating to absorb a suitable water repellent filler, especially an organic substance such as a wax. But as latex rubber does not always adhere satisfactorily to non-porous surfaces when applying the coating to such surfaces I prefer to apply a preliminary coating of a mixture of rubber latex and sodium silicate, which I permit to dry on the base material and render it insoluble by exposure to an acid or an acidic atmosphere, e. g. to a weak solution of hydrochloric acid or to an atmosphere containing carbon dioxide or hydrogen chloride gas. Excess acid and reaction products are removable by washing with water. Over this preliminary coating I then may apply one or more additional coats of a coating material from the class consisting of rubber latex and sheet rubber and incorporate into the coating the wax.

The water repellent filler is applied in the liquid state. Thus, in the case of a wax, the surface of the rubber is immersed in, or otherwise contacted with, paraffin wax heated to a temperature somewhat above its softening temperature. For example, if the wax has a softening temperature of 45° C., a suitable temperature of application would be 65–75° C. I have found that the wax pentrates the rubber and renders it impervious to water, hydrochloric acid of all strengths and many other chemicals of a corrosive nature.

The waxed surface which remains on the rubber is not disadvantageous for many purposes, but if desired it may be removed by heating the rubber for a suitable time at a temperature above the softening temperature of the wax, e. g. at 70° C. for 15–30 minutes in the case of the wax referred to above, the surface wax being at least partly absorbed by the rubber and the remainder, if any, draining away. After heating in this way, the surface of the rubber appears to be dry and the wax does not melt out again.

By the aforesaid methods, dried latex rubber can be caused to absorb a substantial quantity of wax. Depending upon the quantity of rubber, the temperature, and the time of treatment, the quantity of wax taken up may range between about ⅓ of the weight of the rubber to some 3 times the weight of the rubber, the coating remaining quite flexible throughout that range. In practice, to low a ratio of wax to rubber is undesirable and too high a ratio, although not harmful, has no special advantage, so that one may conveniently aim at the absorption of wax to an amount between about one-half and twice the weight of the dry rubber.

With non-porous material where a preliminary coating is necessary a suitable composition therefor is a mixture of 1 volume of water to 1 volume of sodium silicate solution (sp. gr. 1.42 containing 9.4 per cent of $Na_2O$, 30.3 per cent of $SiO_2$ and 60.3 per cent of water) and 2½ volumes of rubber latex containing 60 per cent by weight of dry rubber content. Conveniently the sodium silicate is added to the water and the mixture to the latex with gentle stirring. The composition can be applied to the base material in any convenient manner, e. g. spraying or floating over the surface of the base material, or immersing or passing the latter through the bath of the composition.

One or more preliminary coats may be applied and, if desired, they may be gently heated, say to 50° C., to improve the adhesion.

The wax or other water-repellant filler employed according to this invention may be applied either to the aforesaid preliminary coating or coatings, or to further coatings of latex rubber that have been applied to the preliminary coating.

The essential properties of the water repellent fillers are that they should be capable of absorption in the rubber latex, and that they should not attack the rubber latex; the most suitable known to me are the class of materials known as waxes, especially the paraffin waxes. A wide variation in the composition of the sodium silicate is permissible. Sodium silicates having a ratio of $SiO_2$ to $Na_2O$ ranging between 2.5 and 3.5 and preferably between 3.1 and 3.4 are especially suitable. The specific gravity of the sodium silicate solution is to be varied depending upon the water content of the latex, the total water content being regulated to give an adhesive of consistency desirable for coating.

This process may be applied to the production of corrosion resisting, metal, wood, fabric, paper, wire, twine rope and similar fabrics.

The invention can be utilised in numerous ways. Thus, wooden or metal drums can be lined with a corrosion-resistant coating, or paper bag liners, calico bags and clothing such as gloves, leggings, masks and armlets can be treated. Paper or fabric can be made into bags before or after treatment with latex and then treated with wax on one or both sides, to produce a chemical-proof and air-proof bag which may be used alone or as a liner for a bag of ordinary type. The seams are sealed in the process of waxing. Or the seams of bags may be made by applying heat to soften the appropriate portions of the rubber-wax material, which renders it very tacky and adhesive. The invention further comprises tapes or strips coated according to the invention, e. g. for use for sealing packages by the local application of heat or for patching. The invention further comprises the composition itself, i. e. dried latex rubber that has been caused to absorb a quantity of wax or other water-repellent filler.

As many apparently widely different embodiments of this invention may be made without departing from the spirit and scope thereof, it is to be understood that I do not limit myself to the specific embodiments thereof except as defined in the appended claims.

I claim:

1. The process for preparing an adherent, flexible and non-absorbent coating of latex rubber, which comprises coating a base material with a mixture consisting of rubber latex and sodium silicate solution, allowing the coating to dry, treating the same with an acidic insolubilizing agent, applying one or more additional coats of a coating material from the class consisting of rubber latex and sheet rubber, and incorporating a wax into the coating.

2. A process according to claim 1 wherein the insolubilizing agent is an acid.

3. A process according to claim 1 wherein the insolubilizing agent is dilute hydrochloric acid.

4. A process according to claim 1 wherein the insolubilizing agent is an acidic gas comprising essentially carbon dioxide.

5. A process according to claim 1 wherein the base coating composition comprises one volume of water, two and one-half volumes of a latex containing 60% by weight of dry rubber, and one volume of an aqueous solution of sodium silicate consisting of 9.4% of $Na_2O$, 30.3% of $SiO_2$ and 60.3% of $H_2O$.

GLADSTONE W. WORRALL.